Sept. 1, 1936.  D. I. LEVINE  2,052,982
SPRING ASSEMBLY
Filed Dec. 16, 1935
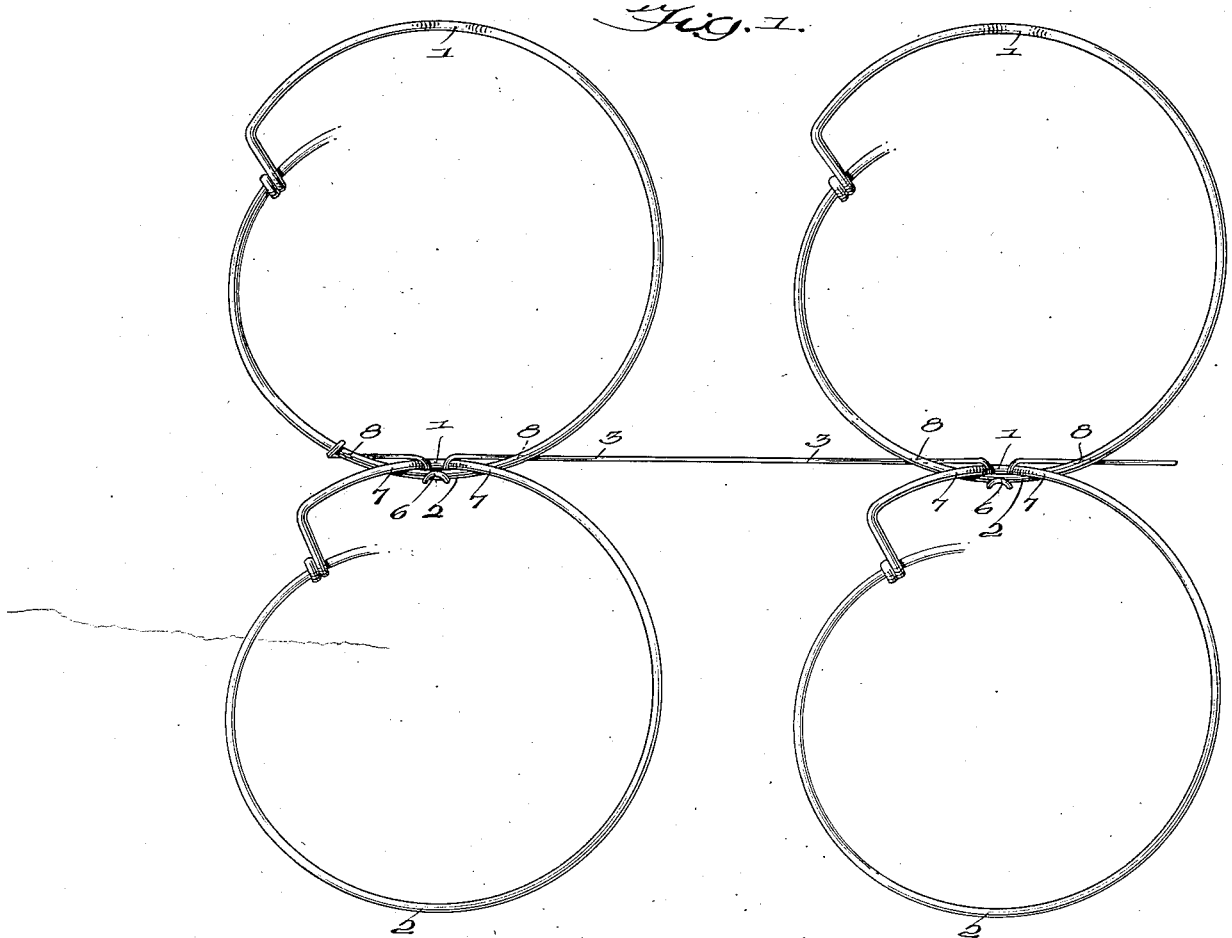
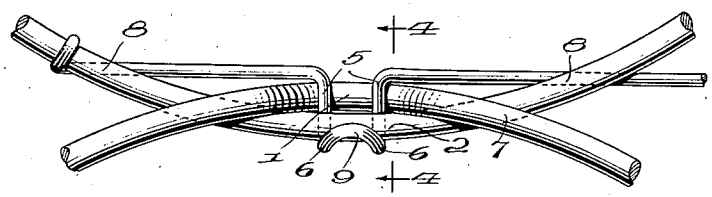
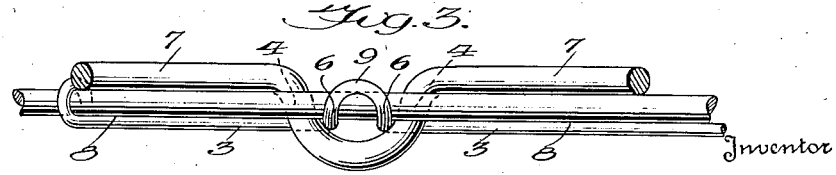
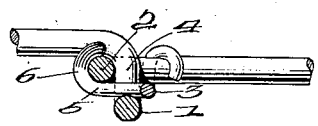
Inventor
David I. Levine,
By A. Feinberg
Attorney Patented Sept. 1, 1936

2,052,982

UNITED STATES PATENT OFFICE 2,052,982

SPRING ASSEMBLY

David I. Levine, Lynn, Mass., assignor to Lisson & Melen Company, Lynn, Mass., a corporation Application December 16, 1935, Serial No. 54,778

6 Claims. (Cl. 5—272)

This invention relates to spring assemblies as in bed springs, automobiles, mattresses, cushions and the like, containing a plurality of springs, such as are normally used as a foundation for upholstery.

A primary object is to produce an economical and effective assembly, the individual springs of which are fastened together so that they remain in spaced relationship and can not rotate with respect to each other; the mutual deflections of their terminal coils being noiseless, nonrattling and restricted within the limits of ordinary usage, resulting in the same flexibility as a free hinged unit while in use but with sufficient rigidity for handling and construction purposes.

In accordance with my invention the assembly produced is less expensive, as it is fabricated by less skilled workmanship than is usually required. Moreover, a complete assembly embodying my invention requires fewer parts because of its novel laced junctions, which eliminate the necessity for a supporting base or peripheral frame-work as required with assemblies in which the springs are freely hinged, as well as in most other prior constructions, to produce additional rigidity for handling purposes.

As the flexure of the terminal coils of the springs is limited to the angle of normal usage, the resulting product returns to and retains its original shape for a longer period than heretofore with no resultant concaving or other deformation of the unit as a whole.

Further objects of the invention will hereinafter appear from the following description of a preferred embodiment illustrative of the invention and shown in the accompanying drawing in which, Figure 1 is a plan view of an outer end portion of an assembly embodying the invention showing the disposition of the coils and their connection by a tie wire.

Figure 2 is an enlarged detail plan view of my restricted hinge junction.

Figure 3 is a side view of the same.

Figure 4 is an enlarged section of the junction taken on the line 4—4 in Figure 2.

Referring to Figure 1 of the drawing, the spring assembly therein shown as illustrative of one embodiment of my invention comprises a plurality of coil springs having terminal coils laced together by means of tie wires. As shown, the type of coil spring to which my invention is preferably, but not exclusively, applied, comprises terminal coils having their ends knotted to the adjacent coil of the spring to provide the spring with inherent compression and render the terminal coils substantially free from coiling or uncoiling deformation without reliance on peripheral framework for the purpose, and the springs are preferably arranged in a plurality of rows maintained in spaced relation by the same tie wires which serve to lace together the springs making up the individual rows.

As above noted, this mode of lacing or hinging together of the springs is peculiar to my invention, and produces a novel restricted two way hinging action. In the form shown, this is accomplished while having each of the springs in exact duplicate of every other one, but modifications in this respect fall within the scope of my invention. In effecting this hinging in the form shown, one side of the terminal coil of each spring in the assembly is formed with a loop, 1, offset inwardly and axially of it. In preferred embodiments of my invention there is also a similar loop at a corresponding point on the terminal coil at the opposite end of the spring. The legs of said loop, hereinafter referred to, are designated 4—4.

Contiguous to this loop and under it, there is placed a corresponding normal and undistorted section, 2, of the terminal coil of an adjacent spring.

Tie wire, 3, has laterally offset loops, in each of which loops, both legs 5, 5, and crown 9 are in the same plane before being bent into operative position in the assembly.

The crown 9 of the tie wire loop is passed through the loop 1, and its legs 5, 5, rest on the legs 4, 4, of loop 1, which acts as a stirrup for them. The legs 5—5 are then bent upwardly and axially of the spring, as at 6, 6, around the undistorted coil, 2, of the adjacent spring placed under loop 1, and contiguous to it. Thus a restricting and retaining cradle is formed for coil 2, which coil in turn now must act as a fulcrum for the distorted coil at points 7, 7.

After assembly, the linear portions, of tie wire 3, between its laterally offset loops, rest against the inner face of the undistorted coil portion 2, at points 8, 8.

The terminal coils at their junctions with the tie wires can thus be extended or compressed only a predetermined limited amount with the novel results already described. In addition, it will be observed that in the preferred embodiment the loop crown 9 of the tie wire 3 does not extend appreciably above the level of the outer face of the deformed terminal coil, and that it is rounded, which, together with the structural features above described, improves the smoothness of the outer face of the assembly.

Having described a preferred embodiment illustrative of my invention, I claim:

1. A spring assembly comprising contiguous coiled spring units arranged in a plurality of rows, the terminal coil portion of each of said springs having a short bend forming a hook over the terminal coil portion of an adjacent spring unit of the row, tie wires extending transversely of the rows and connecting them, said tie wires having spaced offset loops, a loop of said tie wire extending through the bend in the terminal coil of one unit, upwardly about the terminal coil of the adjacent unit with the mid-portion of the loop terminating inwardly of the outer face of the last named coil portion.

2. A spring assembly comprising a plurality of rows of coiled spring units and tie wires having spaced laterally offset loops cooperating therewith, a terminal coil of one of said springs having a loop offset inwardly and axially of it, the legs of said loop overlapping the undistorted terminal coil of the adjacent spring and being spaced to receive the legs of one of the laterally offset loops of said tie wire, the legs of said tie wire loops passing through the offset in the distorted coil and under the undistorted coil, said loop being bent upwardly and axially of the spring to form a restricting and retaining cradle for the last named coil portion.

3. A spring assembly comprising a plurality of rows of coiled springs, each spring having on its terminal coil a loop offset inwardly and axially of it which overlaps the undistorted terminal coil of the spring disposed adjacent to it, and tie wires having linear portions engaging against the inner face of said undistorted coil and having spaced laterally offset loops which lace together each pair of companion terminal coils, said loops passing over the loop of the distorted coil, under the undistorted coil and being bent upwardly and axially of the spring forming a retaining cradle for said undistorted coil, said offset loops on the tie wire holding the rows of springs in spaced relationship.

4. In a spring assembly, an inwardly and axially offset loop formed in the terminal coil of a spring and functioning as a stirrup, a tie wire having a laterally offset loop extending through said stirrup and bent upwardly and axially of the spring forming a restricting and retaining cradle, and a second terminal coil having an undistorted portion disposed under the distorted coil and within said cradle, said second terminal coil contacting the first mentioned terminal coil and acting as a fulcrum support therefor at points adjacent to both sides of the axially offset loop.

5. A spring assembly comprising a plurality of rows of coiled spring units, each spring having on its terminal coil a loop offset inwardly and axially of it, which overlaps the opposite undistorted portion of the adjacent terminal coil each pair of such adjacent companion coils being laced together by a tie wire having laterally offset loops at spaced intervals, said loops passing between and in contact with the legs of the axial loop, thence under and upwardly and over the undistorted terminal coil, terminating inwardly of the outer face thereof.

6. A spring assembly comprising a plurality of coiled spring units and a tie wire having a spaced laterally offset loop cooperating therewith, a terminal coil of one of said coiled springs having an offset portion extending axially from the plane of the coil and away from the outer face of the coil, a terminal coil of another of said springs having an undistorted portion over which said offset portion of the first mentioned coil is hooked, said tie wire having its standing parts engaged against the inner face of the second mentioned coil and having its loop extending through the offset portion of the first mentioned coil in a plane substantially parallel with the planes of the coils and having the end of its loop bent upwardly about that portion of the second mentioned coil over which the first mentioned coil is hooked and terminating inwardly of the outer face of said first mentioned coil.

DAVID I. LEVINE.